United States Patent [19]

Nohren, Jr. et al.

[11] Patent Number: 5,609,759

[45] Date of Patent: Mar. 11, 1997

[54] BOTTLE FILTER CAP

[75] Inventors: John E. Nohren, Jr.; Henry C. Reid; Joseph H. Nohren; John T. Smith; Donald G. Huggins, Jr., all of Clearwater, Fla.

[73] Assignee: Innova Pure Water Inc., Clearwater, Fla.

[21] Appl. No.: 460,721

[22] Filed: Jun. 2, 1995

[51] Int. Cl.$^6$ ................................................. C02F 1/28
[52] U.S. Cl. ........................... 210/266; 210/282; 210/472; 210/474
[58] Field of Search .................................... 210/282, 472, 210/464, 466, 468, 469, 266, 474

[56] References Cited

U.S. PATENT DOCUMENTS

| | | | |
|---|---|---|---|
| 98,343 | 12/1869 | Boyce | 210/472 |
| 647,580 | 4/1900 | Parker | 210/472 |
| 690,457 | 1/1902 | Parker | 210/472 |
| 707,873 | 8/1902 | Spencer | 210/472 |
| 2,055,096 | 9/1936 | Dehn et al. | 210/472 |
| 2,172,031 | 9/1939 | Norman | 210/472 |
| 2,212,318 | 8/1940 | Gee | 210/472 |
| 2,222,123 | 11/1940 | Schwab | 210/472 |
| 2,761,833 | 9/1956 | Ward | 210/282 |
| 2,781,312 | 2/1957 | Klumb et al. | 210/282 |
| 2,869,724 | 1/1959 | McDevitt | 210/282 |
| 3,038,610 | 6/1962 | Hetherington | 210/282 |
| 3,220,555 | 11/1965 | Silha | 210/469 |
| 3,449,081 | 6/1969 | Hughes | 210/282 |
| 3,782,549 | 1/1974 | Muller | 210/282 |
| 3,951,798 | 4/1976 | Haldopoulos | 210/469 |
| 4,024,991 | 5/1977 | Tyson et al. | 210/466 |
| 4,605,499 | 8/1986 | Wise | 210/282 |
| 4,695,379 | 9/1987 | Nohren, Jr. et al. | 210/282 |
| 4,753,728 | 6/1988 | VanderBilt et al. | 210/282 |
| 4,769,144 | 9/1988 | Nohren, Jr. | 210/282 |
| 4,798,671 | 1/1989 | Mijers et al. | 210/282 |
| 5,013,459 | 5/1991 | Gettings et al. | 210/264 |
| 5,080,800 | 1/1992 | Heyl et al. | 210/683 |
| 5,122,272 | 6/1992 | Iana et al. | 210/282 |
| 5,126,044 | 6/1992 | Magnusson et al. | 210/282 |
| 5,128,036 | 7/1992 | Svensson | 210/282 |
| 5,211,973 | 5/1993 | Nohren, Jr. | 210/282 |
| 5,273,649 | 12/1993 | Magnusson et al. | 210/264 |
| 5,273,650 | 12/1993 | Vermes et al. | 210/282 |
| 5,401,399 | 3/1995 | Magnusson et al. | 210/136 |
| 5,417,860 | 5/1995 | Kay | 210/472 |
| 5,431,813 | 7/1995 | Daniels | 210/282 |
| 5,496,471 | 3/1996 | Heyl et al. | 210/282 |
| 5,545,315 | 8/1996 | Lonneman | 210/275 |

*Primary Examiner*—Cynthia L. Nessler
*Attorney, Agent, or Firm*—Nixon & Vanderhye P.C.

[57] ABSTRACT

A filter assembly, particularly for use with a plastic bottle having an open neck with an inside diameter of about 50 mm or less (e.g. about 25 mm), includes a tube of filtering material connected to one surface of a cap while a valve extends from an opposite surface of the cap. The tube is preferably of filtering material such as activated carbon with plastic binder, having a substantially continuous liquid-porous sidewall, a hollow interior, a first closed end, and a second open end. The tube is operatively connected to the cap second surface at the tube second open end by sonic welding, a mechanical connection, or adhesively. The cap has a fitting portion for cooperating with the bottle neck, such as internal screw threads or a snap portion. The valve may be a reciprocating valve, a baby bottle nipple, or a spray device. A biocidal medium may be disposed within the hollow interior of the filter tube, and the tube may be wrapped with a filter material having a pore size of about 1–4 microns. The filtering material is capable of reducing the level of chlorine and water passing through it by at least 50% at a flow rate of about 5 ml/second.

23 Claims, 5 Drawing Sheets

BOTTLE FILTER CAP

BACKGROUND AND SUMMARY OF THE INVENTION

There is a significant demand for filtered drinking water, and while this is oftentimes fulfilled with home tap water filters, or by the purchase or use of bottled water, neither are susceptible to ready portability. It is desirable to be able to have filtered drinking water even during travel situations, whether by car, public transportation, or bicycle, and it would be especially desirable to provide a filtering assembly for use with standard plastic water bottles, which filter assembly has optimum portability, for example being capable of being carried in a pocket, purse, fanny pack, or the like. It is especially desirable to be able to have such portability while at the same time being able to filter chlorine out of drinking water. Chlorine has been linked to both arterial disease and types of cancer, and chlorinated water oftentimes has an undesirable taste, as can organic contaminants in the water.

According to the present invention a filter assembly, and a container for dispensing filtered water, are provided which address the needs discussed above. According to the present invention a filter assembly is provided which has almost optimum portability, yet is capable of effectively treating drinking water to remove chlorine and organic taste contaminants therefrom and reduces a variety of chemical contaminants. The filter assembly according to the present invention, for example, is capable of providing at least a 50% reduction in chlorine at a 5 ml/second flow rate of water therethrough, small enough not only to be portable but to be readily mounted in the next or open end of a conventional plastic bottle, such as conventional plastic water bottles, including conventional plastic water bottles having necks with an internal diameter of about 25–50 mm. There is a great deal of versatility associated with the filter assemblies and containers according to the present invention, the actual filter element being connected to the other components either adhesively, mechanically, or by welding (e.g. sonic welding), a cap with which the filter is associated being adaptable to fit any type of closure mechanism on a conventional plastic bottle or the like, and the assembly also including a valve through which the water may be dispensed.

According to one aspect of the present invention a filter assembly for use with a bottle having a circular cross-section neck or open end to simultaneously cap the neck or open end and filter liquid (typically drinking water) poured out of the bottle through the neck or open end, is provided. The assembly comprises the following components: A tube of filtering material, having a substantially continuous liquid-porous side wall, a hollow interior, a first closed end, and a second open end. A cap for the bottle neck or end, having a fitting portion thereof for cooperating with the bottle neck or end and closing the neck or end, the cap having first and second substantially opposite surfaces. A valve operatively associated with the cap. And, the tube operatively connected to the cap second surface at the tube second open end.

The tube may be adhesively connected to the cap second surface, but preferably is welded (e.g. sonically welded) to it, or is mechanically connected to it. For example a mechanical connection may comprise an O-ring received by cooperating grooves formed in the tube and the cap second surface, or the tube may include a flange extending substantially perpendicularly to the hollow interior, the so cap comprising one or more projections for engaging the flange, and the flange and one or more projections providing the mechanical connection, or a locking taper slip fit between the cap closure and filter assembly.

The valve may comprise a baby bottle nipple, a spray valve, or a reciprocating valve of the type conventionally used with plastic water bottles for bicyclists. Such a reciprocating valve has an open first position in which an end portion thereof is most removed from the cap and a closed second position in which the end portion is closest to the cap.

The tube typically has an outside diameter of about 50 mm or less, and is smaller than the bottle neck with which it is to be used, e.g. an outside diameter of less than 25 mm (e.g. about 22 mm) for a conventional plastic water bottle having a 25 mm neck opening.

The cap fitting portion may comprise an internally screw threaded portion or a snap portion. Other types of connections may also be provided, such as bayonet type connections, accessory holding members, or the like.

One preferred composition of filtering material is activated carbon, typically with a binder. For example the filtering material may comprise about 95–30%, about 80–325 mesh, activated carbon powder or granules. The binder may comprise 5–60%, about 75–135 mesh, plastic resin granules. Inert and other types of materials, such as zeolytes, may also be included in the filtering material with which the binder comprises an integral tube. The filter typically has a porosity of about 10–120 microns. To ensure removal of cysts, or other fine particulates, a wrap of filter material having a pore size of about 1–4 microns (e.g. about 1–2 microns) may be disposed exteriorly around the filtering material tube side wall and first closed end. Also other types of water treatment materials may also be utilized, such as a biocidal media disposed within the hollow interior of the filter tube.

According to another aspect of the present invention a container for dispensing filtered water is provided. The container comprises the following components: A plastic bottle having an open neck with an inside diameter of about 50 mm or less, and with a cap engaging portion. A plastic cap having a bottle neck engaging portion, the cap and neck engaging portions cooperating to releasably hold the cap on the neck, the cap having first and second substantially opposite surfaces. A tube of or containing filtering material capable of reducing the level of chlorine in water passing therethrough by at least 50% at a flow rate of 5 ml/second, the tube having a substantially continuous side wall, a hollow interior, a first closed end, and a second open end. A valve operatively associated with the cap. And, the tube operatively connected to the cap second surface, and the tube having an outside diameter less than the inside diameter of the neck.

The tube may comprise activated carbon and binder, the side wall and closed end being liquid porous, or may be of solid plastic with openings or porous plastic and contain filtering media. The bottle neck inside diameter may be about 25 mm, the tube outer diameter about 22 mm, with the tube having a length of about 55–75 mm. The bottle is inverted during use, and valving action may be provided by an air vent formed in the closed end of the tube, e.g. a hole small enough so that liquid may not pass through it but so that air may (e.g. a circular hole having a diameter of about 0.02 mm).

It is the primary object of the present invention to provide a simple yet effective portable filter assembly and container for dispensing filtered water utilizing such a filter assembly.

DETAILED DESCRIPTION OF THE DRAWINGS

Figure 1:
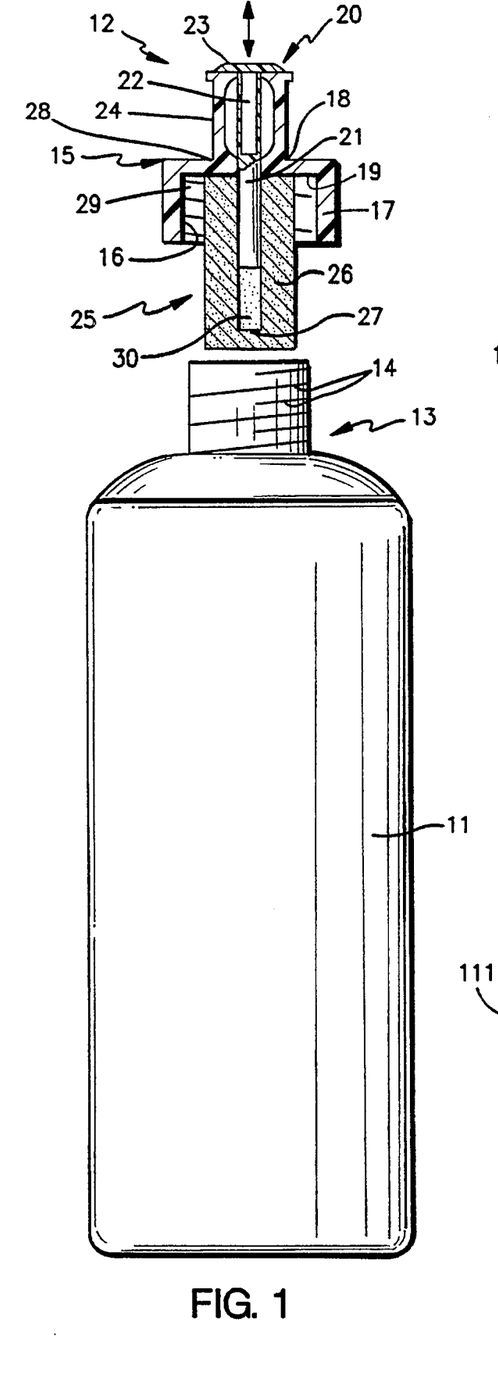
FIGS. 1–3 are side exploded views, partly in elevation and partly in cross-section, of exemplary container embodiments, with filter assemblies, according to the present invention.

FIG. 1 shows an exploded view of one embodiment of the container for dispensing filtered water according to the present invention with a plastic water bottle 11 (e.g. of PVC or PET) as one element thereof and a filter assembly 12 as the second element thereof. The filter assembly 12 is shown in cross-section and the bottle 11 in elevation. The bottle 11 preferably is a conventional plastic water bottle having an open neck 13 that is generally circular in cross-section, and has a diameter of about 50 mm or less, e.g. a standard 25 mm internal diameter. The neck 13 as illustrated in FIG. 1 also has attachment components for attachment to the filter assembly 12, in the embodiment actually illustrated in FIG. 1 these attachment components being in the form of external screw threads 14, although other types of elements [such as bayonet connections, snap-on projections or depressions, or the like] may be provided. The plastic bottle 11 may be relatively rigid, or may be a squeeze type bottle, and may have a volume of about one half pint to two liters.

The filter assembly 12 includes a cap 15 of a relatively hard plastic for closing off the bottle neck 13. The cap 15 has a fitting portion thereof—in the embodiment actually illustrated in FIG. 1 the internal threads 16 of a generally tubular portion 17 thereof—which cooperates with the attachment components (external threads 14) on the bottle neck 13. The cap 15 includes a first (top in FIG. 1) surface 18 and a second (bottom) surface 19, the generally tubular portion 17 containing the fitting portion 16 extending from the second surface 19 and being integral therewith.

The filter assembly 12 also includes a valve, shown generally so by reference numeral 20 in FIG. 1. The valve may be of any suitable conventional type. In the embodiment illustrated in FIG. 1 the valve 20 is of the type used in conventional bicycle water bottles, having a reciprocating movable valve element 21 which is tubular and has an elongated opening 22 therein and an enlarged end portion 23 that is movable from a first position in which the end portion 23 is spaced from the stationary tubular portion 24 of the valve 20, to a second position (illustrated in FIG. 1) in which the end portion 23 engages the stationary portion 24 and does not allow the passage of water from the bottle 11 through the opening 22 around the end portion 23. The valve 20 extends outwardly from the first surface 18, typically the stationary valve element 24 being integral with the cap 15.

The filter assembly 12 also comprises a tube of filtering material, shown generally by reference numeral 25 in FIG. 1. The tube 25 has a substantially continuous liquid-porous side wall 26, a first closed end 27, a second open end 28, and a hollow interior 30. While the filtering material may comprise a wide variety of materials, in the preferred embodiment illustrated in FIG. 1 the filtering material of the tube 25 comprises activated carbon which may be extruded or die molded in combination with plastic resin. For example the tube 25 may have a porosity of 10–120 microns and be produced using about 5–60% binder (such as about 75–135 mesh plastic resin granules) and about 95–30% powdered or granular activated carbon of about 80–325 mesh. Other materials, such as inert materials, zeolytes, and the like, may also be included in the tube 25.

The tube 25 is connected to the cap 15 second surface 19, extending outwardly therefrom and essentially opposite the valve 20. The attachment mechanism in FIG. 1 is shown generally by so reference numeral 29 which may comprise a weld (e.g. an ultrasonic, thermal or spin welding weld). Alternatively the attachment mechanism 29 may comprise an adhesive, such as an ultraviolet cured adhesive, or a mechanical connection (as will be hereinafter described).

The outside diameter of the tube 25 is preferably slightly less than the inside diameter of the neck 13. While theoretically only the height of the bottle 11 limits the maximum length of the tube 25, normally the tube 25 has a length that is significantly less than the height of the bottle 11. The length of the tube 25 must be great enough so that there is a hollow interior void area 30 which is of significant volume to allow a high filtration flow rate. Where the neck 13 has an internal diameter of 25 mm, one particularly desirable configuration of filter tube 25 is a tube having a 22 mm outer diameter, with a 13 mm inner diameter (diameter of the hollow interior 30), and a length from the surface 19 to end 27 of between about 55–75 mm (e.g. about 64 mm). Such a filter tube 25 provides a 50% or better reduction in chlorine of the water flowing therethrough at a 5 ml/second flow rate.

Figure 2:
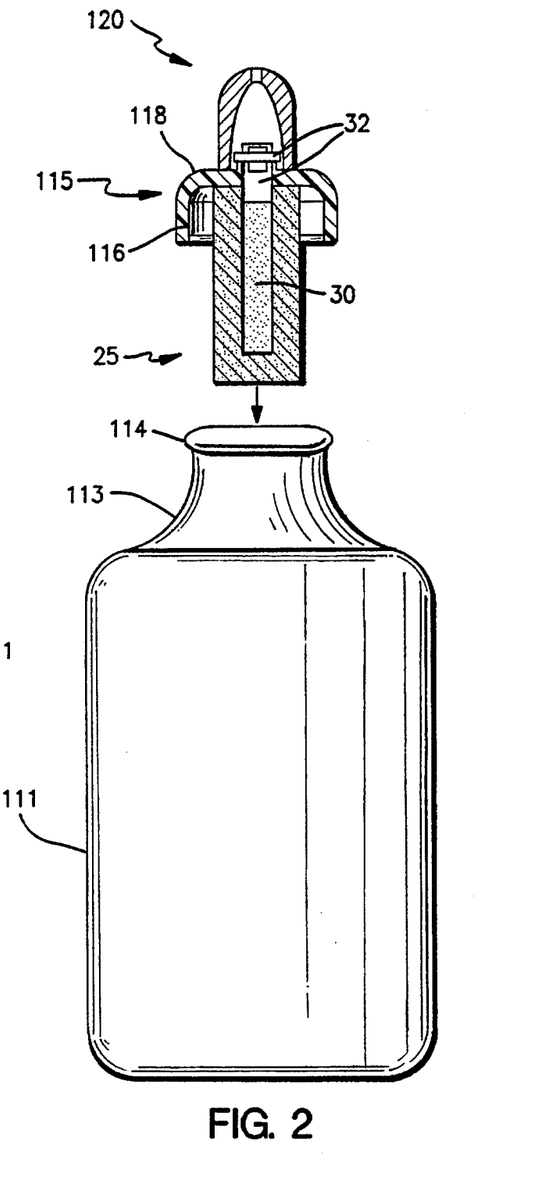

FIG. 2 illustrates an embodiment similar to that of FIG. 1 in which components similar, but not identical to, the components in the FIG. 1 embodiment are shown by the same reference numeral only preceded by a "1" and in which identical components are shown by the same reference numerals. In this embodiment the neck 113 of the plastic bottle 111 has a toroidal element. The cap 115 includes a snap element 116 for cooperating with the element 114 for snapping into place closing the open neck 113. The filter tube 25 is the same, however the valve 120 simply comprises a baby bottle nipple which is bonded to the cap 115 first surface 118 and to an internal hollow stem 32.

While the valves 20, 120 are the preferred valves, other types of valves may also be utilized such as those having pivotal, rotatable, or oscillating movable valve elements.

Figure 3:
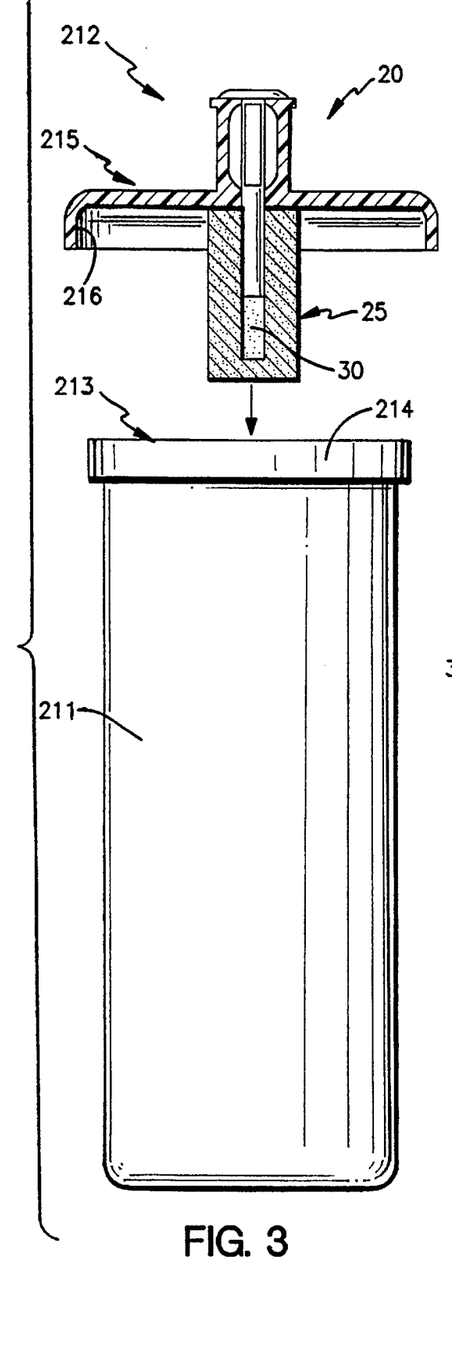

In the FIG. 3 embodiment components identical to those in the FIG. 1 embodiment are shown by the same reference numeral while components that are similar but not identical are shown by the same reference numeral only preceded by a "2".

In the FIG. 3 embodiment the bottle 211 has an open end 213 instead of a neck, with an external ring 214, the ring 214 cooperating with the snap-on component 216 of the cap 215.

The valve 20 and the tube 25 are the same as in the FIG. 1 embodiment.

Figure 4:
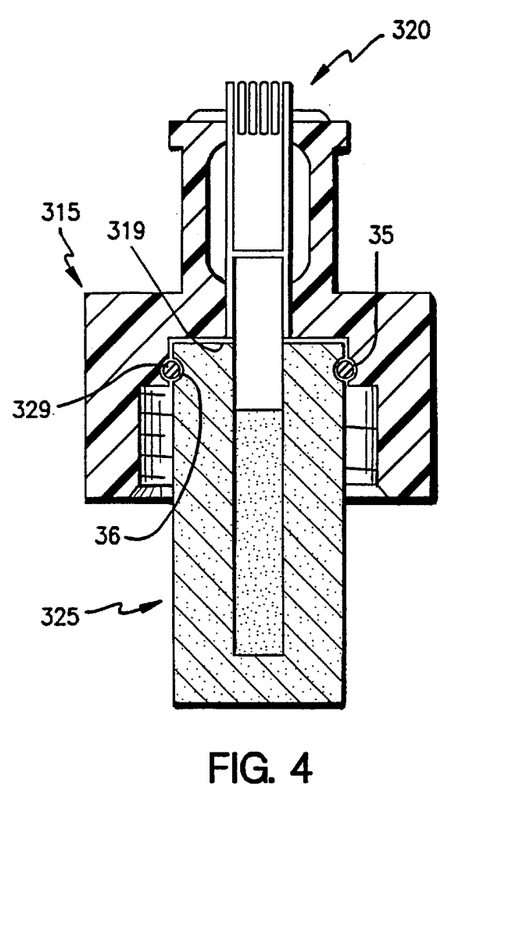
FIGS. 4 through 8 are side views, partly in cross-section and partly in elevation, of other exemplary embodiments of filter assemblies according to the present invention.

FIG. 4 shows a different valve mechanism than in the FIG. 1 embodiment, and a different connection between the filtering tube and the cap. In this embodiment components similar to those in the FIG. 1 embodiment are shown by the same reference numeral only preceded by a "3".

The only difference between the cap 315 and the cap 15, and the tube 325 and the tube 25 is the particular connection between them. A mechanical connection is provided by an O-ring 329 of elastomeric material which is press fit into a groove 35 in a part of the second surface 319 of the cap 315, and also into a groove 36 in the side of the filter tube 325.

In the FIG. 4 embodiment the valve 320 is shown only schematically; a valve 320 is known per se valve element which has two stages, being movable to a first stage in which it opens and one can drink from the valve 320, or to a second position in which a spray may be provided thereby.

Figure 5:
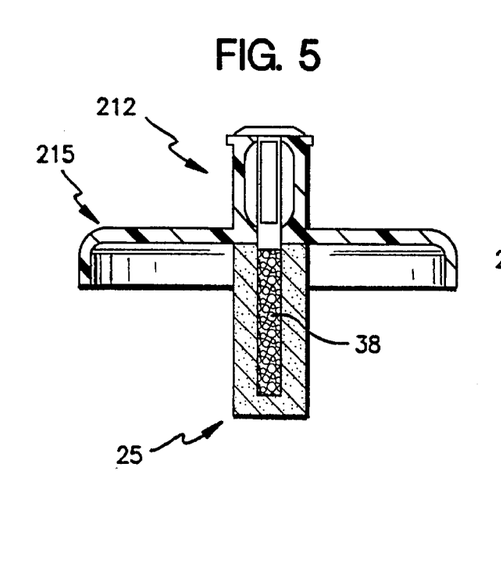

FIG. 5 shows a filter assembly 212 the same as the filter so assembly in the FIG. 3 embodiment except that instead of the hollow interior 30 of the filter material tube 25 being open it includes a biocidal material 38, such as a porous iodinated resin filter.

Figure 6:
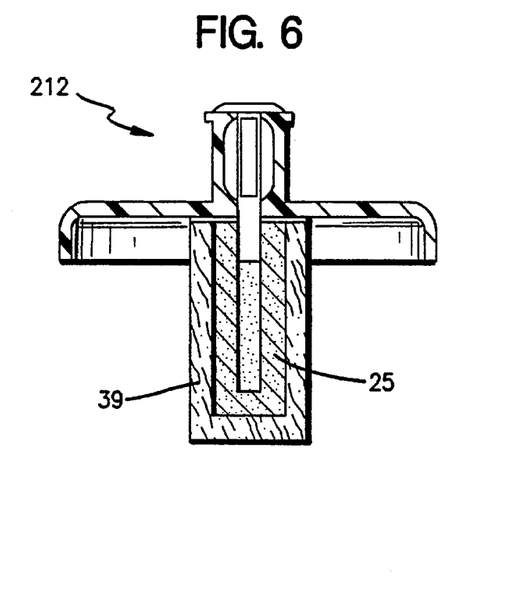

FIG. 6 shows a filter assembly 212 the same as that in the FIG. 3 embodiment except that the filter tube 25 has a low micron filter cloth or other material 39 wrapped around it. The filter material cloth or other material 39 has a pore size of about 1–4 microns, preferably about 1–2 microns, and may be bound to the tube 25 by tack "welds", spaced adhesive portions, or any other suitable manner including some sort of fight, shrink, fit around tube 25. The permeable cloth or other material (e.g. a foam) 39 reduces or eliminates the passage of cysts and other larger biological contaminants out of the bottle 211 into the tube 25.

Figure 7:
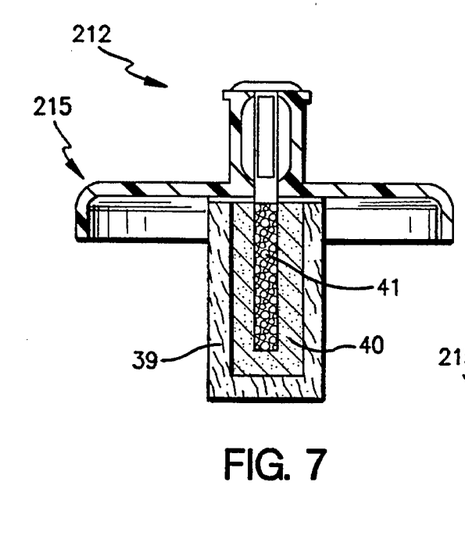

The filter assembly 212 in the FIG. 7 embodiment is the same as in the FIG. 3 embodiment except that the tube of filtering material—shown by reference numeral 40—instead of being of activated carbon and binder comprises a bonded (with binder) porous iodinated resin filter tube having a low micron filter element 39 wrapped around it, and in the hollow interior a highly porous carbon tube insert 41.

Figure 8:
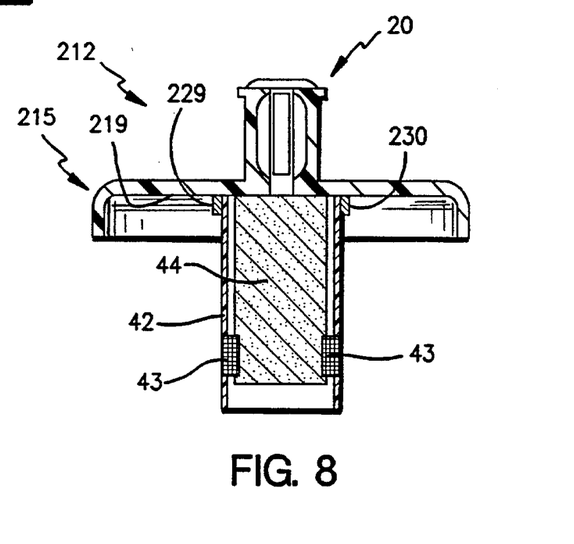

The filter assembly 212 in FIG. 8 is the same as that in FIG. 3 except the filtering element comprises a substantially solid plastic protective housing 42 having a plurality of screened openings 43 around the circumference thereof, and filled with granular activated carbon 44, the plastic housing 42 being bonded at 229 by an ultrasonic weld or adhesive to the inside surface 219 of the cap 215, or by a friction fit with mating cylindrical suction 230 formed into cap 215.

Figure 9:
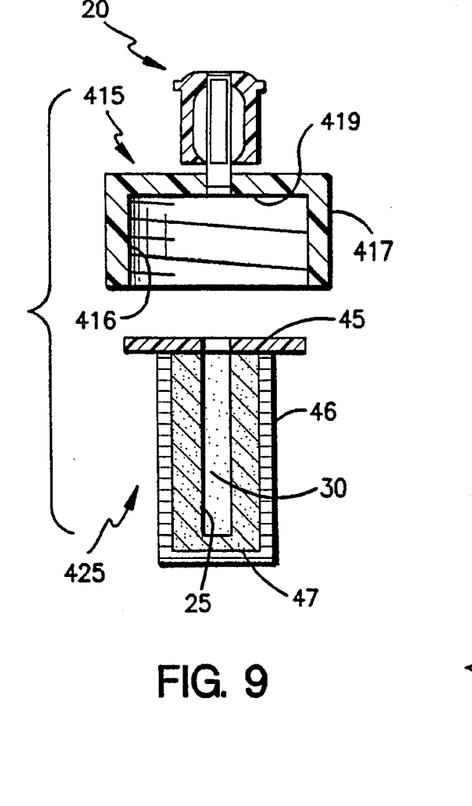
FIG. 9 is a side exploded cross-sectional view of another exemplary embodiment of filter assembly according to the present invention.

In the FIG. 9 embodiment the components similar but not identical to those in the FIG. 1 embodiment shown by the same so reference numeral only preceded by a "4" and the valve element—which is identical to that in the FIG. 1 embodiment—being shown by the same reference numeral.

The cap 415 provides a different type of mechanical connection to the filter assembly 425. The filter assembly 425 has a mounting flange, of relatively rigid plastic, 45 at the top thereof, while the wall 417 of the cap 415 has a plurality of projections 416 therein. For example the projections 416 may be somewhat flexible spaced rings, or may be internal threading which would cooperate with a threaded neck 13 of the bottle 11 in FIG. 1. In any event the mounting flange 45 is dimensioned to engage the projections 416 and either be forced over them, or threaded with respect to them, into a position in which the top of the flange 45 abuts the bottom surface 419 of the cap 415, thus being mechanically connected thereto.

In the FIG. 9 embodiment the filtering material tube 425 preferably comprises a porous generally rigid plastic filter housing 46, and the bottom 47 thereof may be either porous or solid with a filter tube 25 [just like the tube 25 in the FIG. 1 embodiment] disposed within the housing 46, 47.

Figure 10:
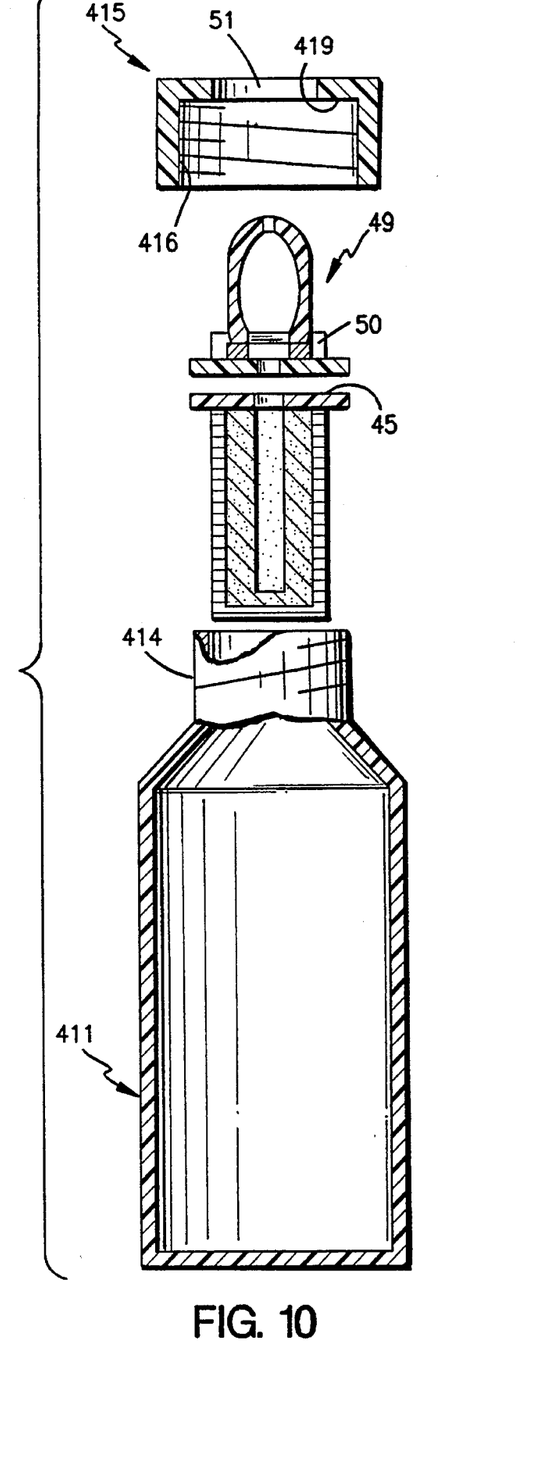
FIG. 10 is a side cross-sectional exploded view of another container with filter assembly embodiment according to the present invention.

The FIG. 10 embodiment is the same as the FIG. 9 embodiment except that instead of the valve 20 being provided the valve is formed by a distinct baby nipple 49 connected to a support 50 with the cap 415 having an open top 51 through which the valve 49 extends until the support 50 engages the shoulder 419 surrounding the opening 51, and the flange 45 abuts the bottom of the support 50. The plastic bottle 411 has external elements 414 which may either comprise spaced rings or external threads cooperating with the spaced rings or internal threads 416 of the cap 415.

Figure 11:
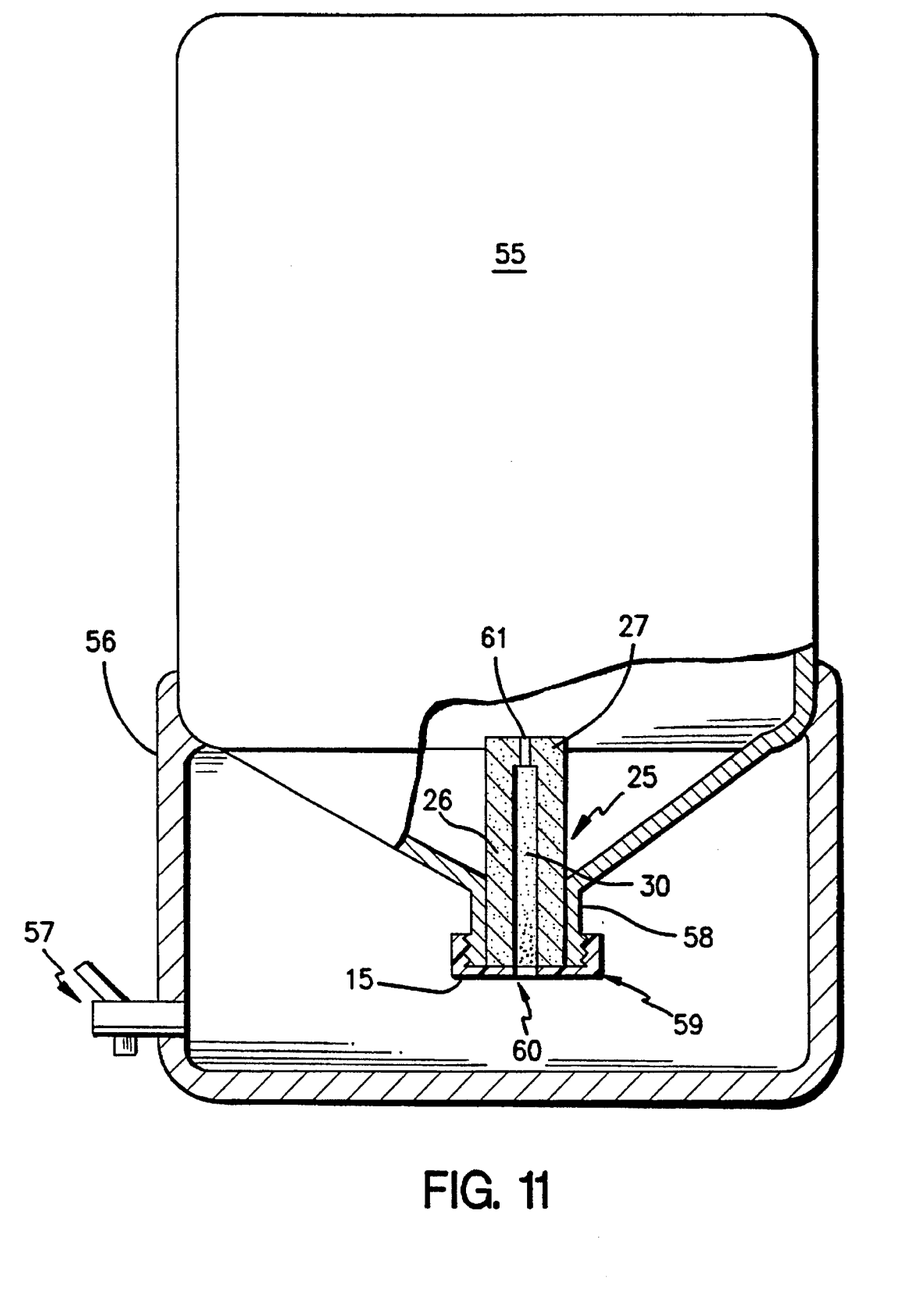
FIG. 11 is a side view, partly in cross-section and partly in elevation, of another embodiment of container with valve assembly according to the present invention.

FIG. 11 illustrates a larger configuration of water bottle 55 which is adapted to be used in the inverted position, for example supported by a crock 56 having a valve/spigot 57 associated therewith. The bottle 55 has a neck 58 which receives the filter assembly 59. The filter assembly 59 is the same as the filter assembly 12 with two differences. The valve is in the form of a restricted opening 60 formed in cap 15, flow being possible therethrough because of a vent opening 61 in the end wall 27 of the activated carbon/binder tube 25. The vent opening 61 is small enough to prevent the passage of liquid therethrough from the interior of the bottle 55 through the neck 58, but large enough to allow the passage of air therethrough. For example it may be a circular cross-section through extending opening having a diameter of about 0.02–0.1 inches (e.g. about 0.04).

Figure 12:
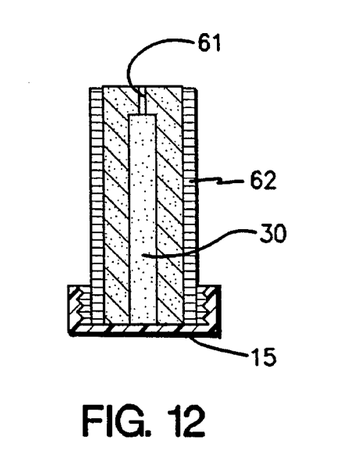
FIG. 12 is a side cross-sectional view of an alternative embodiment of a filter assembly for use in the container embodiment of FIG. 11.

FIG. 12 shows a filter assembly like that of FIG. 11 only a porous plastic filter housing 62 surrounds the side wall 26 of the tube 25.

It will thus be seen that according to the present invention an advantageous portable, convenient, versatile, and effective filter assembly, and container with filter assembly, have been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A filter assembly for use with a bottle having a circular cross-section neck or open end to simultaneously cap the neck or open end and filter liquid poured out of the bottle through the neck or open end, comprising:

a tube of filtering material, having a substantially continuous liquid-porous side wall a hollow interior, a first closed end, and a second open end;

a cap for a bottle neck or end, having a fitting portion thereof for cooperating with a bottle neck or end and closing a neck or end, said cap having first and second substantially opposite surfaces;

a manual valve operatively associated with said cap, in fluid communication with said tube of filtering material and manually movable between a position defining means for allowing liquid flow through said tube and a position defining means not allowing liquid flow through said tube; and said tube operatively connected to said cap second surface at said tube second open end, and wherein said filtering material comprises a substantially continuous self-supporting, self-venting body of activated carbon and binder having a porosity of about 10–120 microns.

2. An assembly as recited in claim 1 wherein said tube is adhesively connected to said cap second surface.

3. An assembly as recited in claim 1 wherein said tube is welded to said cap second surface.

4. An assembly as recited in claim 1 wherein said tube has an outside diameter of less than 25 mm.

5. An assembly as recited in claim 1 wherein said cap fitting portion comprises an internally screw threaded portion.

6. An assembly as recited in claim 1 wherein said cap fitting potion comprises a snap portion.

7. An assembly as recited in claim 1 wherein said filtering material comprises about 95–30%, about 80–325 mesh, activated carbon powder or granules, and about 5–60% about 75–135 mesh, plastic resin granules binder.

8. An assembly as recited in claim 1 further comprising a wrap of filter material having a pore size of about 1–4 microns disposed exteriorly around said filtering material tube sidewall and first closed end.

9. An assembly as recited in claim 1 further comprising a biocidal media disposed within said hollow interior of said tube of filtering material.

10. An assembly as recited in claim 1 and wherein said tube has an exterior diameter of less than 25 mm and a length of about 55–75 mm; and wherein said valve comprises a baby bottle nipple, or a reciprocating valve having an open first position in which an end portion thereof is most remote from said cap, and a closed second position in which said end portion thereof is closest to said cap; and wherein said tube is connected to said cap by adhesive, mechanically, or by welding; and wherein said cap fitting portion comprises an internally screw threaded portion or a snap portion; and wherein said filtering material is capable of reducing the level of chlorine in water passing therethrough by at least 50% at a flow rate of 5 ml/second.

11. An assembly as recited in claim 1 wherein said tube is mechanically connected to said cap second surface.

12. An assembly as recited in claim 11 wherein said tube is connected to said cap second surface by an O-ring received by cooperating grooves formed in said tube and a portion of said cap second surface.

13. An assembly as recited in claim 11 wherein said mechanical connection comprises an internal cylindrical section molded into said cap into which said tube fits forming a friction fit by means of mating surfaces; or a ridge molded into one of said cap or tube which corresponds to a mating indention in the other of said cap or tube.

14. An assembly as recited in claim 11 wherein said tube includes a flange extending substantially perpendicular to said hollow interior, and said cap comprises one or more projections for engaging said flange, said flange and one or more projections providing mechanical connection between said cap and said tube.

15. A container for dispensing filtered water, comprising:

a plastic bottle having an open neck with an inside diameter of about 50 mm or less, and with a cap engaging portion;

a plastic cap having a bottle neck engaging portion, said cap and neck engaging portions cooperating to releasably hold said cap on said neck, said cap having first and second substantially opposite surfaces;

a self-supporting, self-venting tube of or containing filtering material capable of reducing the level of chlorine in water passing therethrough by at least 50% at a flow rate of about 5 ml/second, said tube having a substantially continuous liquid porous side wall having an axis, a hollow interior, a first closed end, and a second open end;

a manual valve operatively associated with said cap, in fluid communication with said tube of filtering material and manually movable between a position defining means for allowing liquid flow through said tube and a position defining means not allowing liquid flow through said tube; and said tube operatively connected to said cap second surface, and said tube having an outside diameter less than said inside diameter of said neck, and positioned with respect to said-cap within said bottle so that said tube axis is substantially transverse to said second surface and so that flow of liquid through said tube is primarily radial with respect to said tube axis during filtering, and through said side wall.

16. A container as recited in claim 15 wherein said tube comprises activated carbon and binder, said side wall and closed end being liquid porous; and wherein said bottle neck inside diameter is about 25 mm, said tube outer diameter is about 22 mm, and said tube has a length of about 55–75 mm.

17. A container as recited in claim 15 wherein said self-supporting, self-venting tube of or containing filtering material comprises filtering material having a porosity of about 10–120 microns.

18. A container as recited in claim 15 wherein said filtering material element comprises a substantially continuous body of activated carbon and binder.

19. A container as recited in claim 18 wherein said self-supporting, self-venting tube of a substantially continuous body of filtering material comprises filtering material having a porosity of about 10–120 microns.

20. A container as recited in claim 15 wherein said tube is mechanically connected to said cap second surface.

21. A container as recited in claim 20 wherein said mechanical connection comprises an internal cylindrical section molded into said cap into which said tube fits forming a friction fit by means of mating surfaces.

22. A filter assembly for use with a bottle having a circular cross-section neck or open end to simultaneously cap the neck or open end and filter liquid poured out of the bottle through the neck or open end, comprising:

a tube of filtering material having a porosity of about 10–120 microns, and having a substantially continuous liquid-porous side wall having an axis, a hollow interior, a first closed end, and a second open end;

a cap for a bottle neck or end, having a fitting portion thereof for cooperating with a bottle neck or end and closing a neck or end, said cap having first and second substantially opposite surfaces;

a manual valve comprising a baby bottle nipple extending from said cap first surface; and said tube operatively connected to said cap second surface at said tube second open end, and positioned with respect to said cap within a bottle so that said tube axis is substantially transverse to said second surface and so that flow of liquid through said tube is primarily radial with respect to said tube axis during filtering, and through said side wall.

23. An assembly as recited in claim 22 wherein said tube comprises a substantially self-supporting, self-venting, body of filtering material having a porosity of between 10–120 microns.

* * * * *

(12) EX PARTE REEXAMINATION CERTIFICATE (10584th)
United States Patent
Nohren, Jr. et al.

(10) Number: US 5,609,759 C1
(45) Certificate Issued: May 5, 2015

(54) BOTTLE FILTER CAP

(75) Inventors: John E. Nohren, Jr., Clearwater, FL (US); Henry C. Reid, Clearwater, FL (US); Joseph H. Nohren, Clearwater, FL (US); John T. Smith, Clearwater, FL (US); Donald G. Huggins, Jr., Clearwater, FL (US)

(73) Assignee: PURE WATER GLOBAL, INC., Addison, TX (US)

Reexamination Request:
No. 90/012,453, Aug. 24, 2012

Reexamination Certificate for:
Patent No.: 5,609,759
Issued: Mar. 11, 1997
Appl. No.: 08/460,721
Filed: Jun. 2, 1995

(51) Int. Cl.
*B01D 24/00* (2006.01)
*B01D 27/00* (2006.01)
*C02F 1/00* (2006.01)
*C02F 1/28* (2006.01)

(52) U.S. Cl.
CPC .................. *C02F 1/002* (2013.01); *C02F 1/283* (2013.01); *C02F 1/003* (2013.01); *C02F 2307/02* (2013.01)

(58) Field of Classification Search
None
See application file for complete search history.

(56) References Cited

To view the complete listing of prior art documents cited during the proceeding for Reexamination Control Number 90/012,453, please refer to the USPTO's public Patent Application Information Retrieval (PAIR) system under the Display References tab.

*Primary Examiner* — Carlos Lopez (57) ABSTRACT

A filter assembly, particularly for use with a plastic bottle having an open neck with an inside diameter of about 50 mm or less (e.g. about 25 mm), includes a tube of filtering material connected to one surface of a cap while a valve extends from an opposite surface of the cap. The tube is preferably of filtering material such as activated carbon with plastic binder, having a substantially continuous liquid-porous sidewall, a hollow interior, a first closed end, and a second open end. The tube is operatively connected to the cap second surface at the tube second open end by sonic welding, a mechanical connection, or adhesively. The cap has a fitting portion for cooperating with the bottle neck, such as internal screw threads or a snap portion. The valve may be a reciprocating valve, a baby bottle nipple, or a spray device. A biocidal medium may be disposed within the hollow interior of the filter tube, and the tube may be wrapped with a filter material having a pore size of about 1-4 microns. The filtering material is capable of reducing the level of chlorine and water passing through it by at least 50% at a flow rate of about 5 ml/second.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 7, 10, 12 and 14-21 is confirmed.

Claims 1-6, 8-9, 11, 13 and 22-23 are cancelled.

\* \* \* \* \*